(No Model.)
J. W. McCALL.
SPECULUM.
No. 357,216. Patented Feb. 8, 1887.
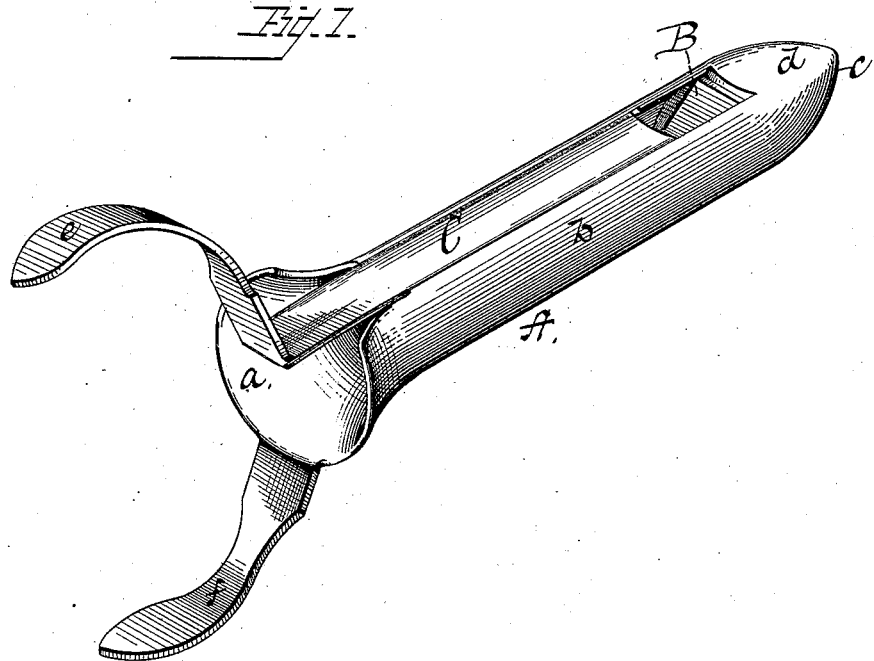
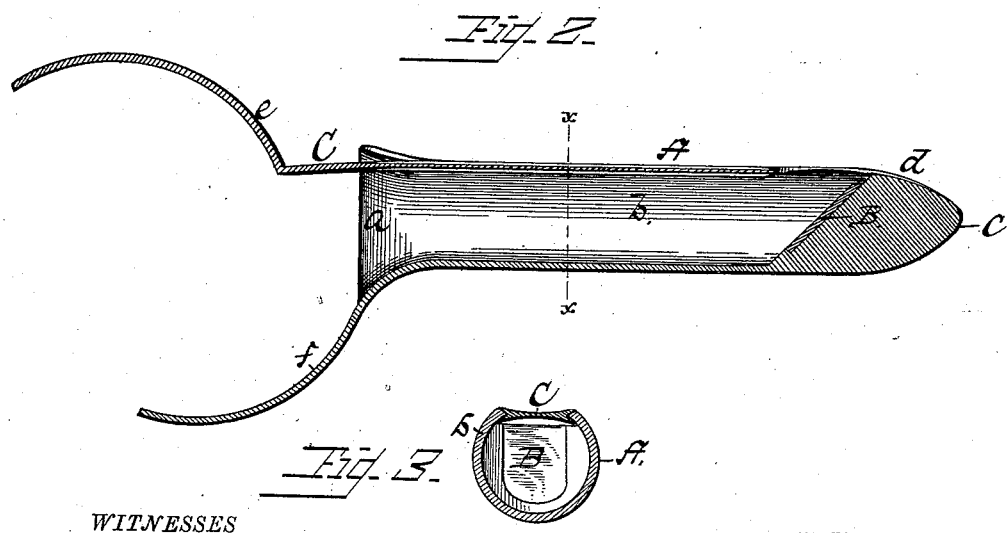
WITNESSES
Franck L. Ourand
R. B. Stokes
INVENTOR
Jos. W. McCall
by A. G. Heylmun
Attorney
N. PETERS, Photo-Lithographer, Washington, D. C.

UNITED STATES PATENT OFFICE.

JOSEPH W. McCALL, OF HUNTINGDON, TENNESSEE.

SPECULUM.

SPECIFICATION forming part of Letters Patent No. 357,216, dated February 8, 1887.

Application filed December 29, 1883. Serial No. 115,917. (No model.)

*To all whom it may concern:*

Be it known that I, JOSEPH W. McCALL, a citizen of the United States of America, and a resident of Huntingdon, in the county of Carroll, in the State of Tennessee, have invented a new and useful Recto-Vaginal Speculum, of which the following is a specification.

My invention relates to that class of specula formed with a slot in the side extending the length of the tube and provided with a slide fitted to the slot; and my invention consists in securing in the forward or closed end of the tube a mirror, and, further, in forming the slide concave in cross-section or depressed from the direction of the line of circumference of the body of the tube.

These novel features or elements are hereinafter fully described, and specifically pointed out in the claims.

I have clearly illustrated my improved speculum in the accompanying drawings, wherein Figure 1 is a perspective view of the complete instrument with the slide partially withdrawn and the mirror disclosed in the end of the tube. Fig. 2 is a longitudinal sectional view; and Fig. 3 is a view in cross-section, taken through the line *x x* of Fig. 2.

The letter A represents the body of the instrument formed with a flaring rim, *a*, of sufficient extent or dimensions to hold up the superabundant external soft parts found in fleshy subjects, and prevent these parts from projecting over the edges of the instrument and obstructing the internal reflections. This form also obviates the presence of an assistant to hold these possible obstructions out of the way while the principal is operating.

The tube or body *b* of the instrument, from the base of the rim, is preferably made a regular cylinder in shape, terminating in a closed conical-shaped end, *c*, as shown, the end on one side being slightly depressed or concaved, as shown at *d* in Fig. 1, in order that the transverse formation of the depressed slide and this part of the end may be of the same shape. The tube or body of the instrument is slotted from its rim to the farthest end of the incline in the end of the tube, and in the tube against the incline is secured a mirror, B. This mirror is preferably set in position at an angle of about fifty-five degrees to the body of the instrument. The purposes of the mirror are to light up the interior of the instrument and to enable the operator by the reflection in the mirror to more readily see, examine, and treat the posterior aspect or surface of any tumor, enlargement, fistula, ulceration, polypus, or any other diseased tissue presented in the slot of the instrument. This mirror also presents the least possible friction for the diseased parts presented in the slot to gently travel up out of the slot while withdrawing the instrument.

In the slot is accurately fitted a slide, C, which covers the whole space opened by the slot. The slide C is formed in cross-section, slightly concaved or depressed from edge to edge from the line of circumference of the body of the cylinder, in order that the speculum may be introduced or the slide withdrawn without the resultant pain and irritation usually caused by a slide having its surface on a line with or above the line of circumference of the body of the instrument.

To the slide is secured a handle, *e*, and to the body of the instrument is fixed another one, *f*, substantially as shown. These handles may be rigidly fixed to their respective parts, or they may be hinged thereto, the latter plan making the instrument more convenient to pack, and does not in the least lessen its utility in operating.

I prefer to have the form of the body of the instrument a regular cylinder, since an instrument of such shape is retained in position after insertion without liability to expulsion by the action of the muscles, and it is not necessary to press it forward to retain it in position, as is necessary in some cases with instruments of conical shape.

I am aware that cylindrical tubular specula have heretofore been made with a slotted side provided with a slide fitted therein and the end of the tube inclined and closed.

My improvements consist in forming the slide depressed from the line of circumference or concave in cross-section, and in securing against the inclined end of the tube a mirror, for the purposes stated.

What I claim as my invention, and desire to secure by Letters Patent, is—

1. In combination with a cylindrical tubular speculum with slotted side and closed end, a slide extending the length of the slot and having its outer surface depressed from the line of circumference of the tube, substantially as and for the purpose set forth.

2. In combination, the cylindrical tubular speculum with slotted side and closed end, having the depression $d$, the mirror secured in an inclined position in the front end of the tube, and the slide fitted to the slot in the tube and having its outer surface depressed in cross-section from the line of circumference of the tube, substantially as and for the purpose set forth.

In testimony whereof I have hereunto set my hand in the presence of two attesting witnesses.

JOSEPH W. McCALL.

Attest:
J. A. JOHNSON,
JOHN BELL.